No. 789,079. PATENTED MAY 2, 1905.
L. BRANDENBURG & C. N. HIESTER.
COOLING TANK FOR INTERNAL COMBUSTION ENGINES.
APPLICATION FILED JUNE 24, 1904.
2 SHEETS—SHEET 2.
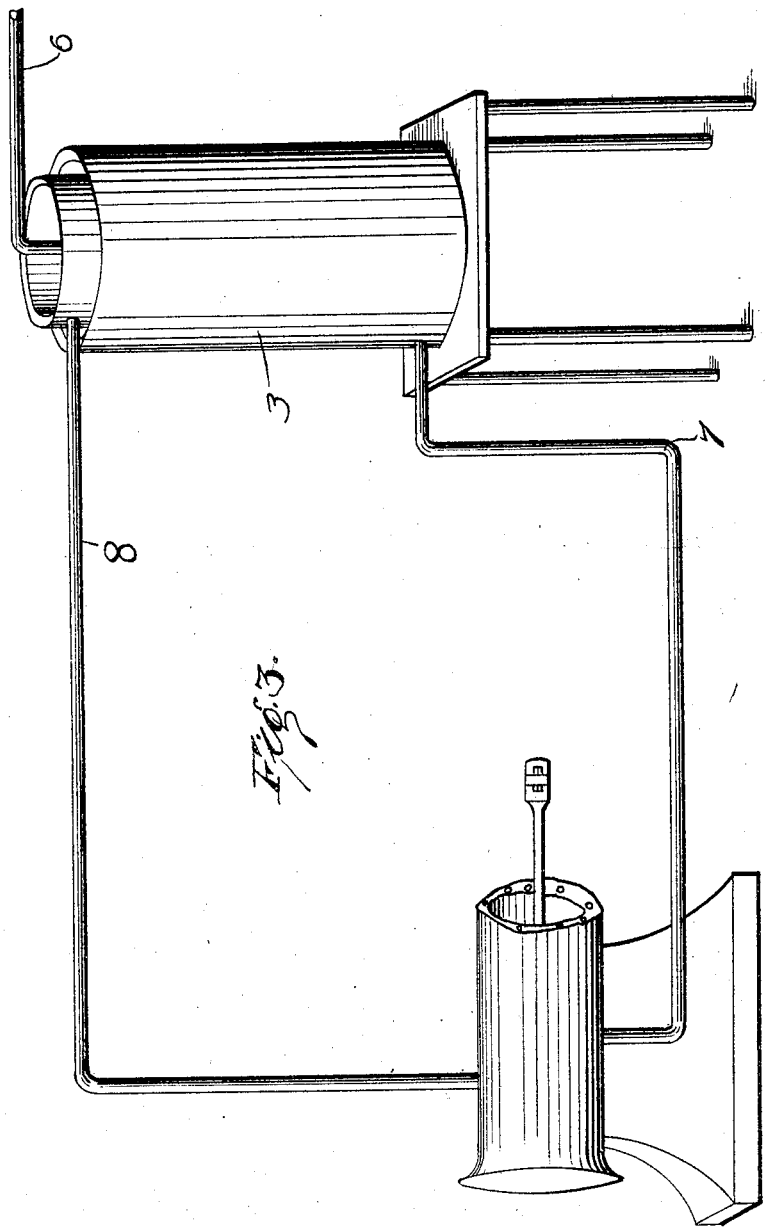
Witnesses
F. J. Veihmeyer
H. M. Tower.
Inventors
Lewis Brandenburg and
Charles N. Heister
by Edsin Bro's
Attorneys No. 789,079.

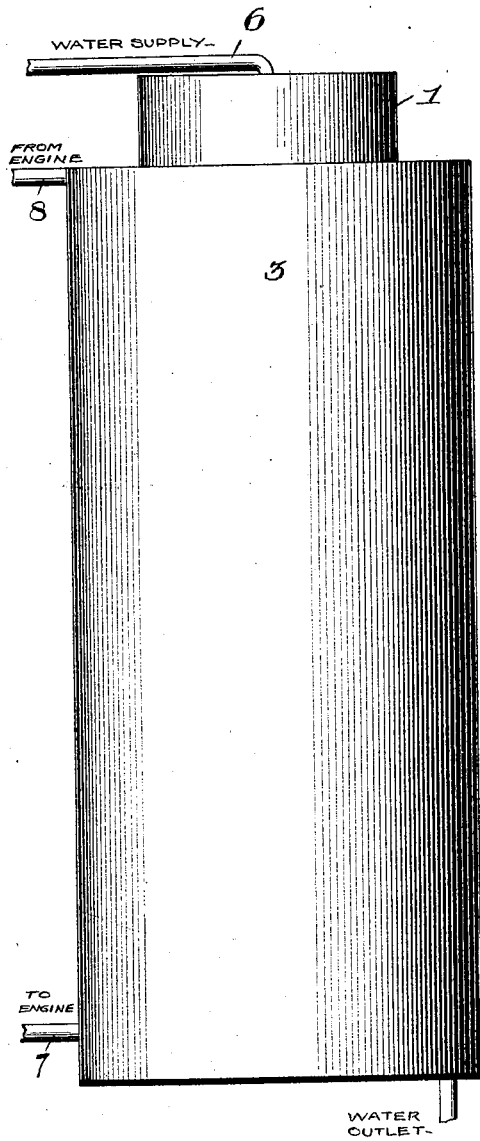
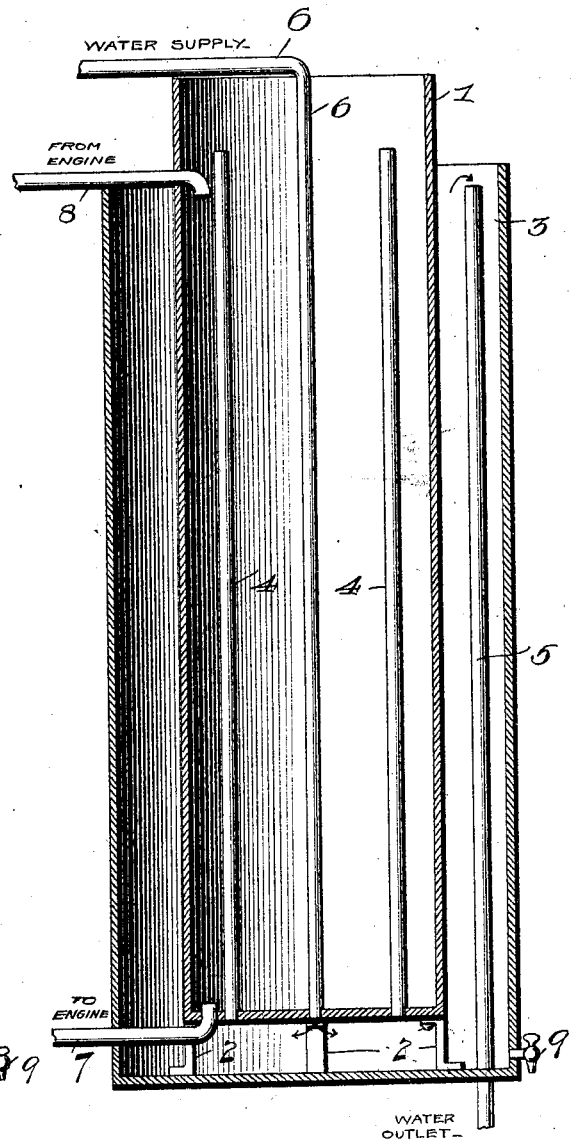

Patented May 2, 1905.

UNITED STATES PATENT OFFICE.

LEWIS BRANDENBURG AND CHARLES N. HIESTER, OF PORTLAND, INDIANA.

COOLING-TANK FOR INTERNAL-COMBUSTION ENGINES.

SPECIFICATION forming part of Letters Patent No. 789,079, dated May 2, 1905.

Application filed June 24, 1904. Serial No. 214,003.

*To all whom it may concern:*

Be it known that we, LEWIS BRANDENBURG and CHARLES N. HIESTER, citizens of the United States, residing at Portland, in the county of Jay and State of Indiana, have invented certain new and useful Improvements in Cooling-Tanks for Internal-Combustion Engines; and we do hereby declare the following to be a full, clear, and exact description of the invention, such as will enable others skilled in the art to which it appertains to make and use the same.

Our invention relates to cooling-tanks for internal-combustion engines.

It has for its object to provide an apparatus which will be effective in cooling the jacket of the engine throughout the day and which is simple in construction and comparatively cheap of manufacture.

The invention consists in the details of construction and combination of parts hereinafter described, and more particularly pointed out in the claims.

In the accompanying drawings, illustrating our invention, Figure 1 is an elevation of our device, and Fig. 2 is a central vertical sectional view thereof. Fig. 3 is a view of the cooler connected up with the cylinder of an engine.

Referring more particularly to the drawings, an inner receptacle 1 is arranged, preferably upon legs 2, within an outer receptacle 3. Said inner receptacle preferably extends above the outer receptacle and has a series of tubes 4 extending from its bottom upward near its upper end. Said tubes are secured to the bottom of the receptacle 1 and are open at their upper ends, whereby the liquid contents of the outer receptacle may seek its own level in said tubes. An overflow-pipe 5 is arranged with its exit-opening below the upper ends of the tubes 4, so that the contents of the outer receptacle cannot escape through said latter tubes into said inner receptacle. The outer receptacle contains water and the inner one oil. The water is fed to the outer receptacle through an inlet-pipe 6, coming in at the top and passing down through the inner receptacle. A suitable outlet-pipe 7 and return-pipe 8, the former arranged at the bottom and the latter at the top of the inner receptacle, are provided for the circulation of the oil. A suitable draw-off cock 9 for the water is also provided near the bottom of the outer receptacle.

It is obvious that water running through the outer receptacle all the time in at the bottom and out at the top will cool the oil or other liquid in the inner receptacle. As said inner receptacle is raised above the bottom of the outer receptacle and also owing to the arrangement of the tubes 4, it will be seen that the water is given a maximum area of the inner receptacle to act upon. It will be noted that as the water as it becomes heated rises to the top and is discharged the oil being fed to the engine from the lower end of the inner receptacle or tank will be from the coolest part of said tank. The water passing through the inlet-pipe 6 will cool the oil to some extent even before it is delivered into the outer tank or receptacle. It will thus be seen that the cold water circulating through the outer tank will cool the oil or other liquid in the inner receptacle, which will always be circulating through the jacket of the engine in a cool state. As shown in Fig. 3, the cool oil enters the jacket of the engine via pipe 7. It remains in the jacket of the engine long enough to heat to the circulating-point and is then driven by the heat out through pipe 8 into the top of the inner tank and is there allowed to cool again. No mechanical device for making the oil circulate is employed. The heat from the cylinder will cause the oil to circulate before it becomes hot enough to damage the engine.

We prefer to use oil as the cooling medium for the engine, because it does not freeze and burst the jacket in winter and will not lime up said jacket. However, other liquids may be used and other changes made without departing from the spirit or sacrificing the advantages of our invention. We therefore reserve the right to make such changes as fairly fall within the scope of our invention.

Having thus described our invention, what we claim as new, and desire to secure by Letters Patent, is—

1. A cooling apparatus, of the character described, comprising an outer liquid-containing receptacle, a liquid-containing tank arranged above the bottom of and within said outer liquid-containing receptacle, said inner tank having tubes extending into the same for the introduction of the contents of the outer receptacle, a feed-pipe for said outer receptacle passing through said inner tank, an overflow-pipe for said outer receptacle, and circulating-pipes to and from said inner tank.

2. A cooling apparatus, of the character described, comprising an outer liquid-containing receptacle, a liquid-containing tank arranged above the bottom of and within said outer liquid-containing receptacle, said inner tank having tubes extending into the same for the introduction of the contents of the outer receptacle, feed and overflow pipes for said outer receptacle, and circulating-pipes to and from said inner tank.

3. A cooling apparatus of the character described, having an outer liquid-containing receptacle, a liquid-containing tank arranged above the bottom of and within said outer liquid-containing receptacle, circulating-pipes to and from said inner tank, a feed-pipe for said outer receptacle passing through said inner tank, and an overflow-pipe for said outer receptacle.

4. A cooling apparatus of the character described having an outer liquid-containing receptacle, a liquid-containing tank arranged within and extending above said outer receptacle, said inner tank having tubes extending into the same for the introduction of the contents of said outer receptacle, feed and overflow pipes for said outer receptacle and circulating-pipes to and from the inner tank.

5. A cooling apparatus, of the character described, comprising an outer liquid-containing receptacle, a liquid-containing tank arranged above the bottom of and within said outer liquid-containing receptacle, said inner tank having tubes extending into the same for the introduction of the contents of the outer receptacle, a feed-pipe for said outer receptacle passing through said inner tank and opening near the bottom of said receptacle, an overflow-pipe for said outer receptacle, and outlet and return pipes for said inner tank arranged near the bottom and near the top, respectively, of said tank.

In testimony whereof we affix our signatures in presence of two witnesses.

LEWIS BRANDENBURG.
CHARLES N. HIESTER.

Witnesses:
JOHN W. JAY,
F. ROY HOLMES